Aug. 9, 1927.

F. TIBBLE

FAUCET

Filed Sept. 16, 1925

1,638,020

INVENTOR.
Frederick Tibble
BY Cyrus W. Rice
ATTORNEY.

Witness:
J. Hagestein

Patented Aug. 9, 1927.

1,638,020

UNITED STATES PATENT OFFICE.

FREDERICK TIBBLE, OF GRAND RAPIDS, MICHIGAN.

FAUCET.

Application filed September 16, 1925. Serial No. 56,755.

The present invention relates to faucets and the like; and its object is to provide a structure of that character improved in various respects hereinafter appearing; and more particularly, to provide such a structure having improved valve-operating means; and further, to provide in such a structure improved means and methods for assembling and disassembling the parts.

These objects are attained by, and the invention finds preferable embodiment in, the structure hereinafter particularly described in the body of this specification and illustrated by the accompanying drawings, in which:—

Figure 1:
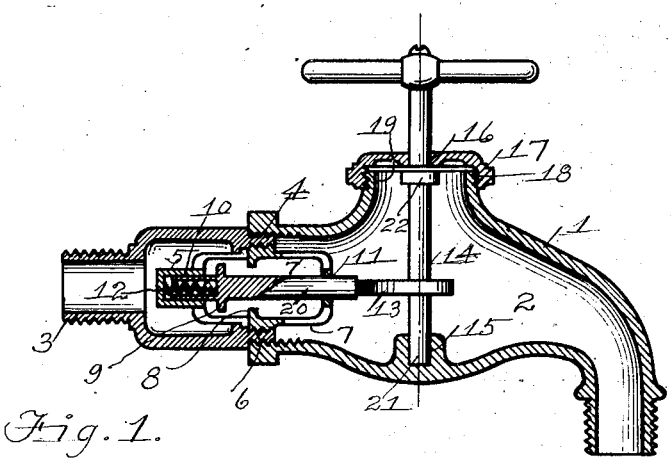
Figure 1 is a vertical longitudinal central sectional view of a faucet having a controlling valve.
Figures 3, 4:
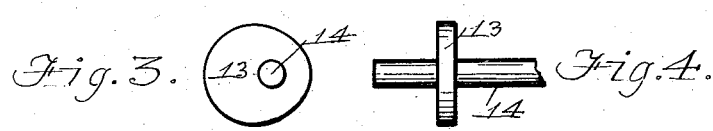
Figure 3 is a plan view of a valve-operating cam.
Figure 4 is a side view thereof and of its carrying shaft.
Figure 2:
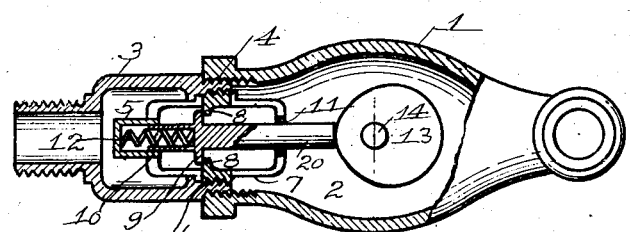
Figure 2 is a view of the same, shown partly in plan and partly in horizontal longitudinal central section.

In the embodiment of the invention illustrated by the accompanying drawings, a faucet is shown having a body 1 with a fluid passage 2 therethrough leading from the supply pipe 3 to which said body is removably secured, as by the screw threads 4. A member 5 is removably secured to this pipe as by the screw threads 6, and has a fluid passage therethrough between its arms 7, and a valve seat 8. The valve 9 is movable slidably in bearings 10, 11 in this member into and out of seating position on the valve seat, being urged by the spring 12 into seating position. The valve is operated to slide the same from the valve seat, by a cam 13 eccentrically carried by a shaft 14 which is axially-removably journalled in the body's rotary bearing 15 and is journalled in a rotary bearing 16 in a cap 17 secured as by screw threads 18 to the body and adapted to close an opening 19 through its upper side, said rotary bearings being thus concentric.

The parts may be readily assembled by screwing the member 5 into the pipe 3, screwing the body 1 on the pipe, inserting the cam 13 through the opening 19, pushing back the valve's stem 20 so that the cam may engage the end thereof, inserting the lower end 21 of the shaft 14 into the bearing 15, and screwing down the cap 17 on the body 1 to close the opening 19 and hold the cam 13 and shaft 14 by its collar 22 in operative position.

The invention being intended to be pointed out in the claim, is not to be limited to or by details of construction of the particular embodiment thereof illustrated by the drawings or hereinbefore described.

I claim:

In a structure of the character described: a pipe having an internally and externally threaded end portion; a body internally threaded on the pipe's externally threaded end portion and having a fluid passage, a bearing whose axis extends transversely to the body's longitudinal direction, and an opening disposed oppositely to said bearing; a member externally threaded on the pipe's internally threaded end portion and having a fluid passage and a valve seat; a valve carried by said member longitudinally movable into and out of seating position on the valve seat; a removable cap adapted to close said opening and having a rotary bearing concentric with the first-mentioned bearing; a rotatable shaft journalled in the second-mentioned bearing and axially-removably journalled in the first-mentioned bearing and carrying an eccentric cam engaging the valve to move the same, the shaft and cam being movable into and out of the body through said opening.

In testimony whereof I have hereunto set my hand at Grand Rapids, Michigan, this 12th day of September, 1925.

FREDERICK TIBBLE.